United States Patent [19]

Rio et al.

[11] Patent Number: 4,853,013

[45] Date of Patent: Aug. 1, 1989

[54] FILTERING STRUCTURE FOR A VENT DEVICE AND DEVICE INCLUDING SAID STRUCTURE

[75] Inventors: Michel Rio, Arzon; Claude Iltis, Saint-Leu-la-Foret; Hervé Louis, Chalon-sur-Saone; Georges Buffet, Saint Marcel; Marcel Joly, Chatenoy-le-Royal; Jean-Francois Goudard, Chalon-sur-Saone; Joël Bacherot, Givry; Claude Ducret, Buxy, all of France

[73] Assignee: L'Air Liquide, Societe Anonyme Pour L'etude et Exploitation des Procedes Georges Claude, Paris, France

[21] Appl. No.: 158,140

[22] Filed: Feb. 17, 1988

[30] Foreign Application Priority Data

Feb. 17, 1987 [FR] France ............... 87 01990

[51] Int. Cl.[4] .............. B01D 29/00; B65D 51/16
[52] U.S. Cl. .............. 55/159; 55/385.4; 55/523; 220/205; 220/373
[58] Field of Search .............. 55/159, 189, 385 C, 55/523; 220/205, 371–373

[56] References Cited

U.S. PATENT DOCUMENTS

| | | | |
|---|---|---|---|
| 2,298,938 | 10/1942 | Griffin, Jr. et al. | 220/373 |
| 2,635,784 | 4/1953 | Bering et al. | 220/373 |
| 2,650,673 | 9/1953 | Bering et al. | 220/371 |
| 2,732,092 | 1/1956 | Lawrence | 220/373 |
| 3,071,276 | 1/1963 | Pellett et al. | 55/385 C X |
| 3,507,708 | 4/1970 | Vignaud | 220/373 X |
| 3,557,536 | 1/1971 | Ririe | 55/523 X |
| 3,575,170 | 4/1971 | Clark | 55/159 |
| 3,778,971 | 12/1973 | Granger et al. | 55/159 |
| 4,136,796 | 1/1979 | Dubois et al. | 220/371 X |
| 4,271,973 | 6/1981 | Quagliaro et al. | 220/371 X |
| 4,271,977 | 6/1981 | Saigne | 55/385 C X |
| 4,315,579 | 2/1982 | Martin, Jr. | 55/385 C X |
| 4,396,583 | 8/1983 | Le Boeuf | 220/371 X |
| 4,427,425 | 1/1984 | Briggs et al. | 55/159 |
| 4,457,758 | 7/1984 | Norton | 55/385 C X |
| 4,487,606 | 12/1984 | Leviton et al. | 55/385 C X |
| 4,512,771 | 4/1985 | Norton | 55/385 C X |
| 4,523,934 | 6/1985 | Joshua | 55/189 |
| 4,637,919 | 1/1987 | Ryder et al. | 55/385 C X |

FOREIGN PATENT DOCUMENTS

| | | |
|---|---|---|
| 0081655 | 6/1983 | European Pat. Off. . |
| 0155115 | 9/1985 | European Pat. Off. . |
| 2509258 | 9/1976 | Fed. Rep. of Germany . |
| 2509428 | 9/1976 | Fed. Rep. of Germany . |
| 1138322 | 6/1957 | France . |
| 2259026 | 2/1978 | France . |
| 1146972 | 3/1969 | United Kingdom . |

Primary Examiner—Robert Spitzer
Attorney, Agent, or Firm—Young & Thompson

[57] ABSTRACT

The filtering structure (20) for a vent device for a liquid container comprises at least two rigid outer elements permeable to gases and to liquids and having confronting parallel bearing surfaces, and an intermediate element 14 permeable to gases and impermeable to liquid is intended to be maintained in a static position between the bearing surfaces of the rigid elements.

17 Claims, 2 Drawing Sheets

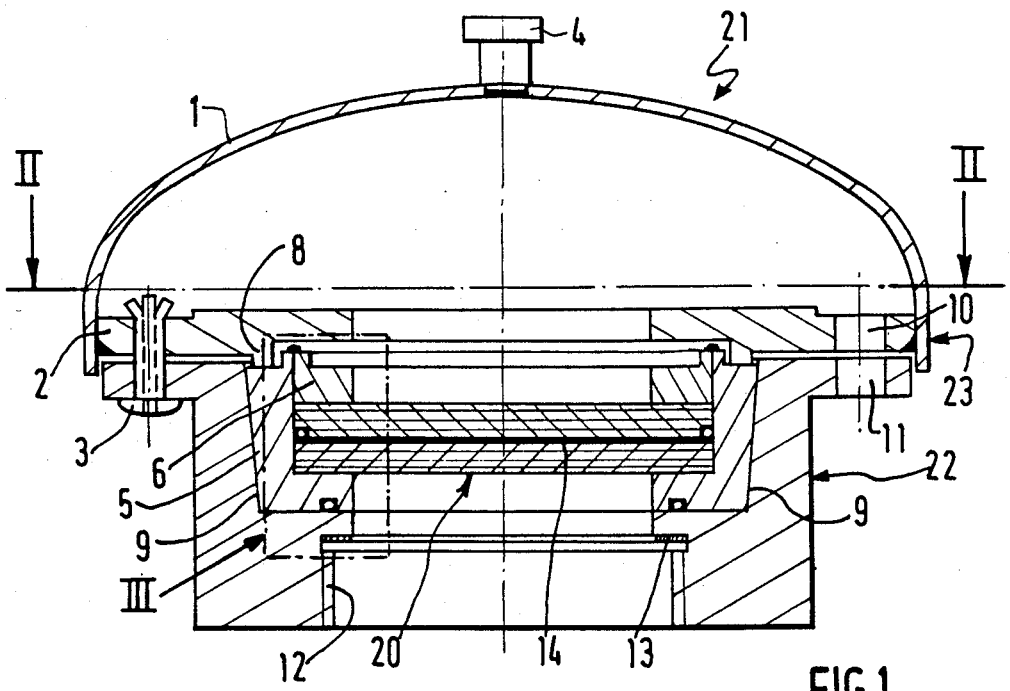
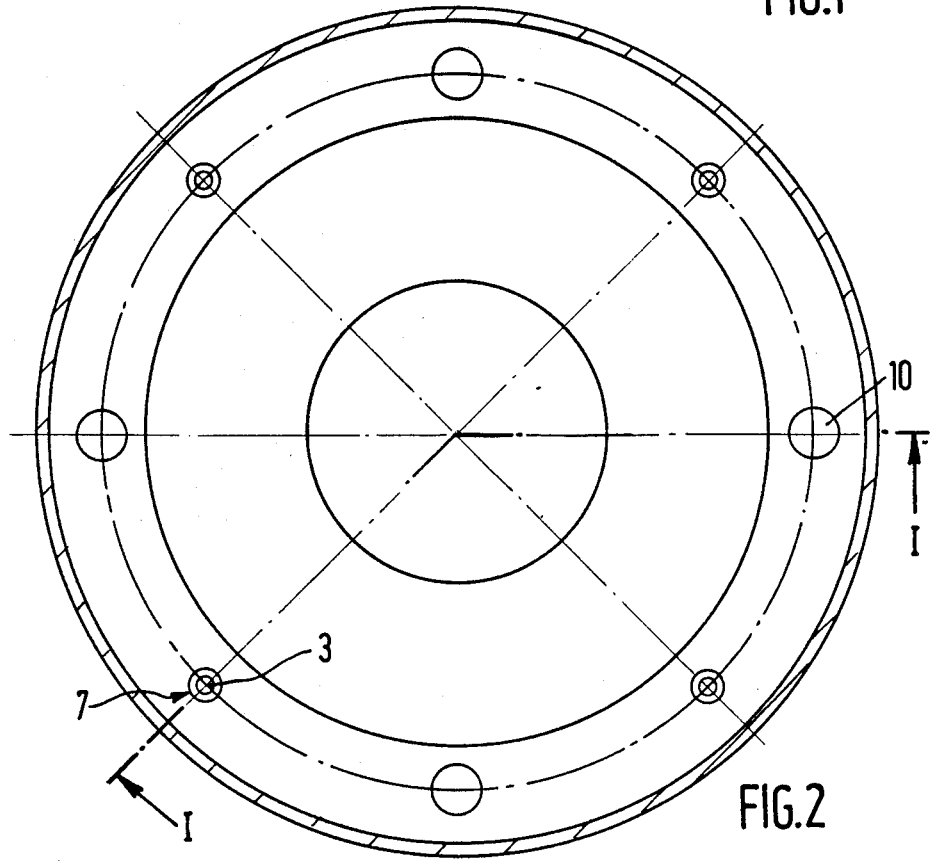

FILTERING STRUCTURE FOR A VENT DEVICE AND DEVICE INCLUDING SAID STRUCTURE

The present invention relates to a filtering structure for a vent device of a liquid container and a vent device including said filtering structure.

Some dangerous materials cannot be enclosed in hermetically-closed containers owing to their property of slow decomposition with emanation of a gas capable of creating over a period of time a dangerous over-pressure in the container.

Among these dangerous materials, there exist in particular liquid materials which permanently give off small quantities of gas; this is the case for example of aqueous solutions of hydrogen peroxide $H_2O_2$ or of mineral peroxides such as the aqueous solutions of monoperoxysulphuric acid or liquid organic peroxides. All these peroxides permanently give off small quantities of oxygen in the gaseous form.

In order to avoid dangerous over-pressures in the enclosures of such products, these enclosures must be provided with closing devices which are sufficiently permeable to the gases and tight as concerns the liquids. It concerns vent devices.

This arrangement, which is stipulated in transport regulations, is difficult to achieve in practice.

Thus, for example, when the enclosure filled to 90-95% with liquid is in a normal position, the vent device in contact with the gas discharges the emanated gas and thus maintains the enclosure without pressure. When the enclosure is in an inverter position owing to an accident or an error when storing, for example, the liquid is in contact with the vent device which should remain temporarily liquid-tight and prevent the liquid from flowing out of the enclosure; but if the enclosure remains in the inverted position for a long time, the gas emitted by the liquid puts the container under pressure and the liquid ends up by slowly flowing through the vent device.

As concerns small enclosures such as jerricans, the capacity of which does not exceed 100 litres, the height of the liquid in the most unfavourable case does not exceed 1 meter. In this case, the vent device is usually made in the form of a pellet of sintered material inserted in the cap or a valve of plastic or elastic material, the pressure for opening the valve being higher than the hydrostatic pressure of the liquid in the container.

When it concerns enclosures for transporting in bulk, tanks are used having a capacities of 20 cu.m. and even more.

These containers or tanks are either mounted on trucks or mounted on trailers or intended for multimode transport (road, rail, boat). Furthermore, in the event of a transport accident or the turning over of these tanks, the vent device must be liquid-tight as long as possible or allow through a flow of liquid which is as small as possible and preferably nil; moreover, it is desired to arrange that this vent device results in practically no over-pressure in the tank in the normal position so as to avoid any accidental spraying of liquid in the course of the discharging operation. In view of the fact that these tanks are, for safety reasons, sometimes devoid of a pipe and opening in the lower part of the tank, they are emptied through pipes fixed to the upper part; this arrangement increase the risks of spraying of liquid by an accidental over-pressure.

At the present time, in the particular case of hydrogen peroxide, the vent device of the tanks transporting for example 70% solutions of $H_2O_2$ by weight is solely formed by a disk of sintered stainless steel having a diameter of 70 mm. and a thickness of 5 mm. disposed in a pipe closed by a screwed cap provided with a few discharge orifices for the gas (or possibly liquid) which escapes through the sintered disk (see FIG. 4).

This sintered disk has a quadruple function:

1. Prevent foreign bodies from falling into the tank (these bodies being capable of decomposing the $H_2O_2$).

2. Filter the compressed air which may be used for putting the tank under pressure for emptying the tank (discharging).

3. Allow the passage of the gas given off (gaseous oxygen given off by the slow decomposition of the $H_2O_2$ —vent function).

4. In the event of an accidental overturning of the tank, limit as far as possible the flow of liquid (solution of $H_2O_2$).

More generally than in the case of $H_2O_2$ and according to certain national and international transport regulations, a vent device must be practically tight with respect to the transported liquid (4.) and yet sufficiently permeable to the gas in order to avoid any over-pressure in the tank (3.).

The last two conditions are extremely difficult to meet in practice and the device described hereinbefore in the case of $H_2O_2$ very imperfectly performs this fourth function.

The invention relates to a filtering structure for a vent device satisfying the last two conditions and comprising at least two rigid outer elements permeable to gases and liquids having having confronting bearing surfaces, and an intermediate element permeable to gases, impermeable to said liquid and adapted to be maintained in a static position between the bearing surfaces of said rigid elements, the intermediate element comprising at least one first filter permeable to the gas and impermeable to the liquid, in contact with one of the bearing surfaces; a peripheral sealing element impermeable to the liquid constituted by a material flowing under pressure disposed on the first filter and defining an inner surface; and a second filter permeable to the gas and impermeable to the liquid disposed on the first filter in coincidence with the inner surface of such peripheral sealing element, the thickness of said sealing element being at rest greater than the thickness of the second filter.

The manner in which the invention can be carried out and the resulting advantages will be apparent from the following description of embodiments which are given by way of a non-limitative example with reference to the accompanying drawings in which:

FIG. 1 is a sectional view of a vent cap taken on line I—I of FIG. 2;

FIG. 2 is a view of the cover of the vent cap taken on line II—II of FIG. 1;

Figure 3:
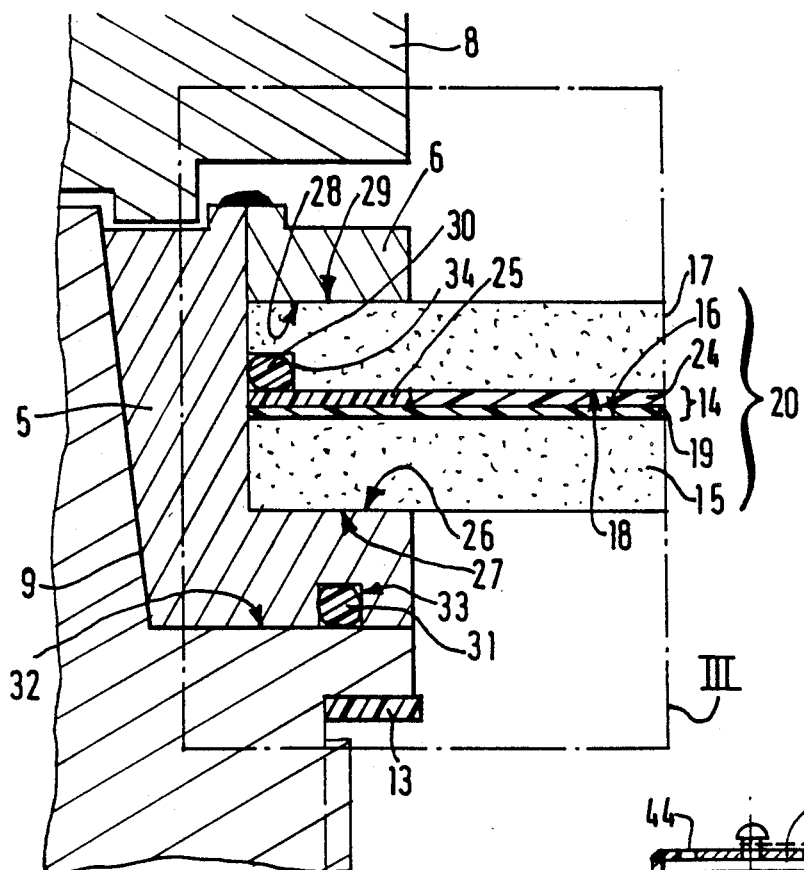
FIG. 3 shows a detail III of FIG. 1, of the sectional view taken on line I—I of the cap shown in FIG. 2.

As can be seen in FIG. 1, the filtering structure 20 in the form of a disk is disposed in the vent cap 21 between the screw-threaded base 22 and the cover 23.

Fixed in the dome 1 is an annular member 2, the assembly of the dome 1 and the member 2 forming the cover 23. The base 22 and the cover 23 form the cap 21. The cover 23 is provided with a rivet 4 for connecting the cap to the tank by means of a chain (not shown). The base 22 and the member 2 of the cover 23 are connected by means of four hollow expansible rivets 3 placed in cylindrical apertures 7 in the member 2 and in corresponding apertures in the base 22 located in facing relation to the member 2. The member 2 and the base 22 further comprise gas discharge orifices 10 and 11 in alignment with each other. The base 22 has a screw thread 12 for screwing the cap 21 on the nozzle of a tank (not shown) and a seal 13.

The filtering structure 20 described hereunder is maintained between a socket 5 which has substantially the same inside diameter as the filtering structure and a maintaining ring 6, the socket 5 and the ring 6 being welded and forming a cartridge which is disposed in the cap 21 in an annular cavity 9 of the base 22 and is maintained in this cavity 9 by the shoulder 8 of the annular member 2.

FIG. 3 shows in detail the structure of the filtering structure 20 and its mounting in a cartridge between the socket 5 and the maintaining ring 6. The filtering structure 20 comprises a first porous and rigid disk 15 having a bearing surface 16 on which is disposed on first filter 19 permeable to gas and impermeable to liquid and having substantially the same area as the first disk 15, and on which is disposed an annular flat seal 25 having substantially the same outside perimeter as the first disk 15 and having an interior surface which is occupied by a second filter 24 permeable to gas and impermeable to liquid, so that it has the same area as the interior of the flat seal 25 and is coincident with the latter, the seal 25 and the second filter 24 being in contact with the bearing surface 18 of the rigid porous second disk 17. The porous disk 17 is moreover provided with an annular recess 34 in facing relation to the flat seal 25. The base surface of the socket 5 is provided with an annular recess 33; O-ring seals 30 and 31 are disposed in these recesses 33 and 34.

Preferably, the materials employed for constructing the filtering structure are chosen to be compatible with the transported liquid and gas. In the case of hydrogen peroxide, there may be used as the rigid outer elements any rigid porous material compatible with $H_2O_2$, and for example disks of sintered stainless steel, sintered glass or sintered plastics material. There is preferably employed as the intermediate element permeable to gas and impermeable to liquid a porous material in respect of which the surface tension between the liquid and the material is negative Thus, the filter is not wetted by the liquid but as it is porous, it remains permeable to gas. In the case of hydrogen peroxide, filters may thus be used which are composed of vinylidene polydifluoride (PVDF) or polytetrafluoroethylene (PTFE). PTFE-PE filters are preferably employed, i.e., filters made form raw PTFE disposed on a lattice of polyethylene (PE) which imparts to the filter its dimensional stability and facilitates its handling when assembling.

Generally, sintered disks having a thickness of about 1 to 5 mm. and pore diameters on the order of 1 to 100 $\mu$m. are suitable. suitable as a filter permeable to gas and impermeable to liquid are filters of PTFE having a thickness of between about 75 and 250 $\mu$m., an internal porosity of between about 50 and 80% or a pore diameter of less than 10 $\mu$m. and preferably 1 $\mu$m.

Preferably, the lattice side of the filter is in facing relation to the bearing surface of the rigid outer element.

Preferably, as described hereinbefore, a complex intermediate element is used comprising two PTFE-PE filters and a peripheral seal. However, in a modification of the invention, a single filter may be used.

As a peripheral seal, there is preferably employed a flat peripheral seal composed of a compressible material, for example an elastomer or plastomer capable of flowing under pressure, and in particular sintered PTFE. Fluorinecontaining rubber O-ring seals may be used as the seal.

FIG. 2 shows more clearly the rivets 3 in the apertures 7 and the vent apertures 10 of the member 2 of the cover 23.

The cap 21 itself (22, 23, 2) and the cartridge 5, 6 are made from a material compatible with transported product, and in the case of, for example, $H_2O_2$ stainless steel.

The embodiment described in detail hereinbefore is not intended to be limitative. Indeed, the symmetry of the devices is not necessarily cylindrical and likewise, the rigid elements of the filtering structure are not necessarily flat. Furthermore, the number of rivets and vent apertures 10, 11 is not imperative.

Although only a filtering structure inserted in a welded cartridge has been described, other means for maintaining the elements in a static position may be envisaged. Other forms of the cartridge may be envisaged, for example cartridges in which the socket and the ring are detachably fixed by screws or rivets. it may also be envisaged to simply dispose the filtering structure between the base 22 and to maintain its various elements between the base and the member 2 of the cover 23 which is fixed or screwed on the base.

However, the arrangement including a cartridge has the advantage of allowing an immediate change of the cartridge without requiring the changing of the complete cap in the event of a clogging of the filtering structure. The cartridge moreover ensures by its rigidity the stability of the compression of the filtering elements when screwing and unscrewing the cap.

The way in which the filtering structure according to the invention performs its double function of permeability to gas and impermeability to liquid in the event of overturning will now be described.

In normal operation, the gas continuously given off by the liquid contained in the container passes through the whole of the filtering structure and escapes through the vent means 10, 11.

Preferably, these vent means are protected by the cap itself, as is the case in the illustrated embodiment, in order to avoid the direct entry of dust, impurities or rainwater into the cap. However, these vent means could be provided in other regions of the cap.

The movements of the liquid poured into the tank create in the region of the vent a succession of pressures and depressions which stress the filtering structure and in particular the intermediate element 14. It is in order to avoid the deterioration of the intermediate element that the latter is held in a static position between the bearing surfaces 16 and 18 of the rigid outer elements 15 and 17. The various parts of the filtering structure are moreover maintained in static position relative to one another by the peripheral surfaces 26 of the sockets 5 and 28 of the maintaining ring 6 which are clamped around and maintain the filtering structure 20 in a fixed position by the annular surfaces 27 and 29 of the rigid porous disks 15 and 17. The base 22 and the cover 23 are interconnected by the rivets 3 when the cap 21 is assembled; the cartridge 5, 6 is maintained in the recess 9 of the base 22 by the shoulder 8 of the member 2 of the cover 21.

When the container is exceptionally in an overturned position, the liquid enters the pipe and the nozzle of the vent device and comes into contact with the filtering structure. It an impregnate and enter the first rigid element to the extent of its bearing surface 16. It then encounters the filter 14 which is impermeable to the liquid and stops it and prevents the liquid from flowing further into the cap. In order to ensure that when the liquid has entered the element 15 it cannot flow through the clearance between the shoulder 9 of the base 22 and the socket 5 of the cartridge, the socket 5 is provided with a circular recess 33 adapted to receive an O-ring seal 31 which provides the seal between the base 22 by contact of the seal with the annular surface 32 of the recess 9 and the edges of the recess 33.

However, it has been stated that in the event that the clamping between the socket 5 and the member 6 is excessive and in the event that a single filter permeable to gas and impermeable to liquid is used, it could happen that the latter, owing to the compression, loses its porosity with respect to the gas. To overcome this drawback, it is preferable to provide a complex intermediate element, such as that described hereinbefore, i.e., having two filters and a peripheral seal. The flat peripheral seal preferably has a thickness at rest which is slightly greater than the thickness of the second filter which occupies its interior area. Thus, when the socket 5 and the maintaining ring 5 are assembled, the material of the flat seal 25 slightly flows on one hand into the pores of the outer rigid element 17 and on the other hand into the pores of the first filter 19 until the total thickness of the first filter 19 and the flat seal 25 under pressure is substantially equal to the thickness at rest of the two filters 19 and 24. It is preferable to provide such a filter 24 which occupies the interior ara of the peripheral seal 25 so as to prevent the first filter 19 from tearing owing to the succession of pressures and depressions to which it is subjected and thus allow it no possibility of movement between the two bearing surfaces 16 and 18 of the two rigid outer elements.

Furthermore, in order to ensure that the liquid which may have accidentally impregnated the rigid element 15 and which would have reached its bearing surface 16, in particular on its periphery, does not flow out of the cap, it is preferable to arrange that the second element 17 be provided with a recess 34 for receiving a seal 30. The latter provides the seal by contacting, on one hand, the flat seal 25, and, on the other hand, the interior cylindrical surface of the socket 5 of the cartridge; the liquid therefore cannot in any way, and even in the event of an overturning, pass through the filtering structure and flow through the vent cap.

The present invention also concerns a vent device for a liquid container comprising a pipe and a vent cap, wherein the cap comprises at least one filtering structure such as defined hereinbefore; a tubular base including a peripheral surface for supporting said structure; a cover including means for maintaining the structure; means for interconnecting the base and the cover; and means which are fluid-tight with respect to the liquid.

The cap of the vent device provided with a filtering structure performs the two essential functions of permeability to the gas and impermeability to the liquid contained in the container. Moreover, in the case of containers containing a dangerous liquid which usually do not have an emptying device provided at the lower level of the container, it is advantageous that the vent device also perform the function of a filter for the compressed air which is injected through this vent device for emptying the container.

In a modification of the invention, the vent device may also be provided with a filter disposed in the part of the vent which remains on the container, and in particular a filter disposed in the vent pipe. This filter prevents, on one hand, impurities contained in the compressed air or other objects from entering the tank (functions (1.) and 2.)) and prevents, on the other hand, during transport, the liquid contained in the tank, when subjected variations in pressure, from reaching the filtering structure according to the invention placed in the cap, wetting it and altering its gas permeability properties. This filter therefore also has a check-valve function. Such a filter is preferably porous, composed of stainless steel, sintered glass or sintered plastics material. These functions are performed by the filter-vent mounted in conventional devices which may therefore remain as such in the devices according to the invention.

Furthermore, during the emptying operations, it might be of interest to protect the filtering structure described hereinbefore from rainwater or washing water which might reach and affect its filtering properties. Consequently, it might be advantageous according to the invention to dispose on the filtering structure provided for example in the cap, a layer of water-resistant material and in particular to protect the filters and the filtering elements by a rep of PTFE.

EXAMPLE

In a cylindrical tank having a capacity of 21 cu.m. filled to the extent of 95% at 20° C., with a 70% solution of $H_2O_2$, the quantity of oxygen resulting from the decomposition of $H_2O_2$ is about at the most 10 l/hr. With such a flow of oxygen, the pressure in the tank would reach $1.5 \cdot 10^5$ Pa within 6 days. The pressure of opening the safety valve of the tank is usually $1.5 \cdot 10^5$ Pa.

Figure 4:
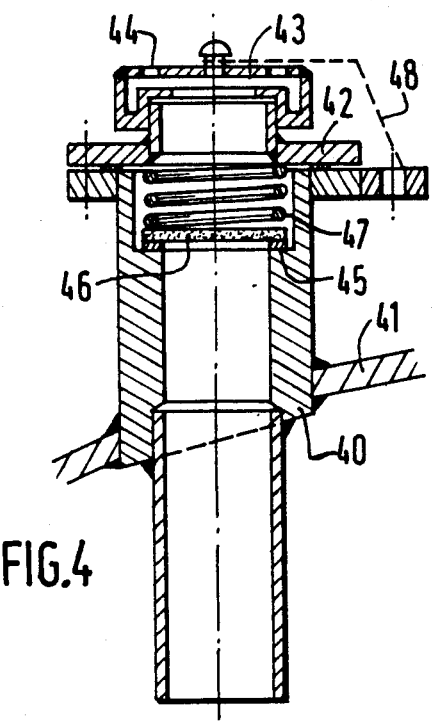
FIG. 4 is a sectional view of a vent device provided with a known conventional cap.

These tanks are conventionally provided with a vent device such as that shown in FIG. 4. The pipe 40 fixed to the tank 41 is provided with a filter 46, namely a disk of sintered stainless steel disposed on an annular seal 45 and held in the pipe 40 by a coil spring 47 maintained by a nozzle 42 on which the vent cap 43 provided with vent apertures 44 is screwed. When emptying, the cap 43 screwed onto the nozzle 42 is unscrewed. A chain 48 connects the unscrewed cap to the nozzle 42. Connected to the nozzle 42 is a pipe supplying compressed air at a nominal pressure of $10^5$ Pa. In order to empty the tank within between half an hour and one hour, the compressed air travelling through the sintered disk must flow at a rate of between about 40 and 20 cu.m./hr.

The following table I lists the results of permeability to air and to 70% $H_2O_2$ of different materials and filtering elements according to the invention.

TABLE I

| MATERIAL DIA. OF PORES ($\mu$m) | USEFUL DIA. (mm) | THICKNESS (mm) | PERMEABILITY TO AIR ($m^3/h/10^5$Pa) *(l/h) | PERMEABILITY TO 70% H O (l/h) |
| --- | --- | --- | --- | --- |
| sintered s. steel °75 | 70 | 5 | 33 | 540 |
| sintered s. steel °14 | 70 | 2 | 11 | 180 |
| sintered s. steel °8 | 70 | 2 | 8 | 130 |
| sintered s. steel °3 | 70 | 2 | 2.5 | 42 |
| PVDF-PE 0.22 | 42 | 0.17 | 10* UNDER 20 $10^2$Pa | 0 |
| PTFE-PE 0.2 | 42 | 0.17 | 10* UNDER 2 $10^2$Pa | 0 |
| sintered s. steel °75 | | 5 | | |
| 2 × PTFE-PE 0.2 | 50 | 0.17 × 2 | 10* under 6,4 $10^2$Pa | 0 |
| sintered s. steel °75 | | 5 | | |
| sintered s. steel °75 | | 5 | | |
| 2 × PTFE-PE 0.5 | 50 | 0.17 × 2 | 10* under 5 $10^2$Pa | 0 |
| sintered s. steel °75 | | 5 | | |
| sintered s. steel °75 | | 5 | | |
| 2 × PTFE-PE 1 | 50 | 0.17 × 2 | 10* under 3,8 $10^2$Pa | 0 |
| sintered s. steel °75 | | 5 | | |

*s. steel = stainless steel

In respect of the first six tests: the tests were carried out under two metres of a liquid column of $H_2O_2$, i.e., under 0.26 $10^5$ Pa of hydraulic pressure.

In respect of the last three tests: a flat seal of sintered PTFE having a thickness of 0.26 mm. and an inside diameter of 50 mm. disposed on the first PTFE-PE filter and the second PTFE filter and disposed within the flat seal.

With a sufficient pressure between the maintaining means of the filtering structure to maintain a static position, the permeability of 70° $H_2O_2$ was measured:

it is nil (0 ml/h) at a pressure of 3.5 $10^5$ Pa in the case of the 7th test;

in the case of the 8th test, it is nil at a pressure of 2.5 $10^5$ Pa and is 5.6 ml/h at 3 $10^5$ Pa, in the case of the 9th test, it is nil at a pressure of 1 $10^5$ Pa and is 5.6 ml/h at 3 $10^5$ Pa, The tests were carried out for 1 hour after some of them had been carried out for 140 h without variation in the flow.

It is therefore quite clear that whatever be the sintered stainless steel disk when the latter is used alone, as is the case in vent devices used at the present time, unacceptable amounts of liquid are allowed through.

The foregoing results show that a vent device according to the invention performs the aforementioned functions. A judicious choice of the PTFE-PE filters, in particular, ensures zero permeability to 70° $H_2O_2$ at a pressure just higher than the pressure actuating the safety valve (example: valve at 1.5 $10^5$ Pa: choice of PTFE-PE having a pore diameter of 0.5 micrometre (8th test).

We claim:

1. Filtering structure for a vent device of a liquid container, comprising at least two rigid outer elements which are gas- and liquid-permeable and have confronting parallel bearing surfaces, and a gas-permeable, liquid-impermeable intermediate element maintained in a static position between said bearing surfaces of said rigid elements, said intermediate element comprising: at least one gas-permeable, liquid-impermeable first filter, said first filter having a first face in contact with one of said bearing surfaces and a second face opposed to said first face an having a peripheral region; a liquid-impermeable peripheral seal made of a material which flows under pressure and disposed on said peripheral region and defining an interior surface; and a gas-permeable, liquid-impermeable second filter disposed on said second face of said first filter, said second filter having a peripheral surface an having a first thickness, in coincidence with said interior surface of said peripheral seal, said seal having a second thickness which, at rest, is greater than said first thickness.

2. Filtering structure according to claim 1, wherein said outer and intermediate elements are made of materials which are compatible with $H_2O_2$.

3. Filtering structure according to claim 1, wherein the outer elements are composed of sintered stainless steel, sintered glass or sintered plastics material.

4. Filtering structure according to claim 1, wherein at least said first filter comprises porous polytetrafluorethylene (PTFE).

5. Filtering structure according to claim 4, wherein said lattice is in facing relation to said one bearing surface.

6. Filtering structure according to claim 4, in which said first filter comprises raw PTFE having a pore diameter less than 10 micrometers disposed on a polyethylene lattice.

7. Filtering structure according to claim 1, wherein the peripheral seal is made from an elastomer or plastomer.

8. Filtering structure according to claim 7, in which said elastomer or plastomer is sintered PTFE.

9. Filtering structure according to claim 1, further comprising means for maintaining the intermediate element and outer elements in said static position.

10. Filtering structure according to claim 9, wherein said maintaining means are provided with an annular recess for receiving a sealing member.

11. Filtering structure according to claim 1, wherein a said rigid element is provided with an annular recess for receiving a sealing member.

12. Vent device for a liquid container, comprising a pipe and a vent cap, the cap comprising: at least one filtering structure, said filtering structure comprising at least two rigid outer elements which are gas- and liquid-permeable and have confronting parallel bearing surfaces, and a gas-permeable, liquid-impermeable intermediate element maintained in a static position between said bearing surfaces of said rigid elements, said intermediate element comprising: at least one gas-permeable, liquid-impermeable first filter, said first filter having a first face in contact with one of said bearing surfaces and a second face opposed to said first face and having a peripheral region; a liquid-impermeable peripheral seal made of a material which flows under pressure and disposed on said peripheral region and defining an interior surface; and a gas-permeable, liquid-impermeable second filter disposed on said second face of said first filter, said second filter having a peripheral surface and having a first thickness, in coincidence with said interior surfaces of said peripheral seal, said seal having a second thickness which, at rest, is greater than said first thickness; a tubular base including a peripheral surface for supporting said structure; a cover including means for maintaining the structure; means for interconnecting the base and the cover; liquid-tight seal means preventing any substantial leak of said liquid around said filtering structure; and vent means for discharging to surrounding atmosphere vent gases having passed through said filtering structure.

13. Vent device according to claim 12, wherein said vent means is protected by said cover.

14. Vent device according to claim 12, wherein the pipe comprises a non-return filter.

15. Vent device according to claim 14, in which said non-return filter is of sintered stainless steel.

16. Vent device according to claim 12, wherein the filtering structure is provided with a protecting layer of a hydrophobic material.

17. Vent device according to claim 16, in which said protecting layer of a hydrophobic material is a rep of PTFE.

* * * * *